April 26, 1966     J. C. CARROLL ETAL     3,248,648
SPEED MONITORING APPARATUS WITH A REFERENCE CHANNEL
AND A VARIABLE CHANNEL EACH EMPLOYING A SATURABLE
CORE DIGITAL-TO-ANALOG CONVERTER
Filed July 9, 1959     2 Sheets-Sheet 1

INVENTORS
Richard O. Decker, Francis T. Thompson
James C. Carroll, Hans Van Gelder
BY
Paul E. Friedemann
ATTORNEY April 26, 1966　　　J. C. CARROLL ETAL　　　3,248,648
SPEED MONITORING APPARATUS WITH A REFERENCE CHANNEL
AND A VARIABLE CHANNEL EACH EMPLOYING A SATURABLE
CORE DIGITAL-TO-ANALOG CONVERTER
Filed July 9, 1959　　　　　　　　　　　　　　　2 Sheets-Sheet 2

United States Patent Office 3,248,648
Patented Apr. 26, 1966

3,248,648
SPEED MONITORING APPARATUS WITH A REFERENCE CHANNEL AND A VARIABLE CHANNEL EACH EMPLOYING A SATURABLE CORE DIGITAL-TO-ANALOG CONVERTER
James C. Carroll, North Huntingdon Township, Westmoreland County, Richard O. Decker, Franklin Township, Westmoreland County, Francis T. Thompson, Penn Hills Township, Allegheny County, and Hans van Gelder, Pittsburgh, Pa., assignors to Westinghouse Electric Corporation, East Pittsburgh, Pa., a corporation of Pennsylvania
Filed July 9, 1959, Ser. No. 826,036
8 Claims. (Cl. 324—70)

This invention relates to electric control systems and more particularly to digital-to-analog speed control systems.

Saturating transformers provide an accurate means of obtaining an output voltage that is proportional to the pulse repetition rate of its input signal. However, errors are introduced into the output signal by variations in the voltage and frequency of the reference circuit, and by fluctuations in the voltage of the direct current power supply. These variations are serious, since an analog control is only as accurate as its reference.

It is the broad object of this invention to provide a very accurate digital-to-analog control system.

A more specific object of this invention is to provide an accurate reference for a digital-to-analog control system.

Another specific object of this invention is to provide compensation for the errors due to the fluctuations of voltage in the direct current supply in a digital-to-analog control system.

Still another specific object of this invention is to provide a dual channel digital to analog speed control system that compensates for temperature differences and capacitive coupling between channels.

Other objects and advantages of this invention will become more apparent from a study of the following detailed description of the invention when done with reference to the accompanying drawings, in which.

Figure 1:
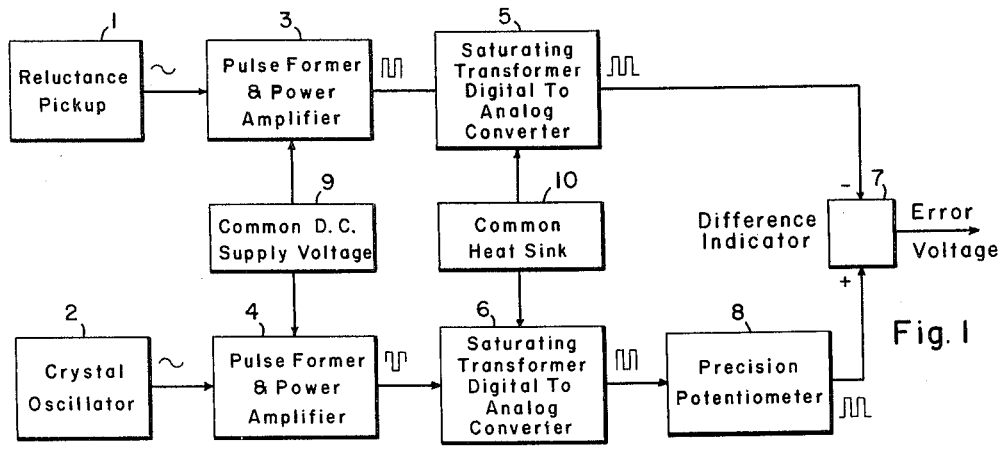
FIGURE 1 is a block diagram of an embodiment of this invention.

Referring to FIGURE 1, two similar digital-to-analog channels are shown. The input to the speed channel is provided from a reluctance pickup 1, which is magnetically coupled to the shaft whose speed is to be controlled. The pulse repetition rate of the output of the reluctance pickup 1 is directly proportional to the speed of the shaft. The output of the reluctance pickup 1 is amplified and clipped by the pulse former and power amplifier 3, to give a square wave input to the saturating transformer digital-to-analog converter 5. The output of the digital-to-analog converter 5 is then fed into the negative input of the difference indicator 7.

The reference channel includes a crystal oscillator 2 which gives a substantially constant frequency output signal. This signal is fed into the pulse former and power amplifier 4, where it is amplified and clipped to provide a square wave input to saturating transformer digital-to-analog converter 6. The output of the digital-to-analog converter 6 is applied to a precision potentiometer 8, whose output, in turn, is fed into the positive terminal of the difference indicator 7. The output of the difference indicator 7 is the analog error signal. A common direct current supply voltage 9 is provided for the pulse former and amplifiers 3 and 4. A common heat sink 10 is also provided for the cores of the saturating transformers of the digital-to-analog converters, 5 and 6.

Figure 2:
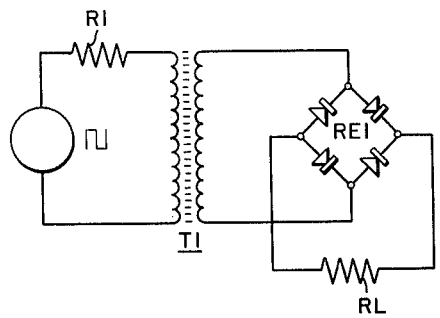
FIG. 2 is a very simplified diagrammatic showing of one of the saturable transformer digital-to-analog converters used in FIG. 1.

The invention functions in the following manner. The crystal of the crystal oscillator 2 is chosen so that its frequency is approximately equal to the highest input frequency of the reluctance pickup 1. The frequency of the square wave output of pulse former and amplifier 3 is proportional to the speed of the shaft to be controlled. The saturating transformer digital-to-analog converter circuit, which may be as shown in FIG. 2, has a direct current voltage output across the load RL that is proportional to its input frequency. This proportionality between input frequency and output voltage is due to the fact that the volt-second area of the output of a transformer is constant when the core of the transformer is driven into saturation for each input cycle. The core of the saturating transformer is of a square loop material such as 4–79 Mi-Permalloy. For additional information on the saturating transformer digital-to-analog converters, reference may be had to the copending U.S. patent application Serial No. 801,659, now Patent No. 3,018,381.

Thus, the voltage output of digital-to-analog converter 5 is proportional to the speed of the shaft. The output voltage of digital-to-analog converter 6 is constant as determined by the frequency of the crystal oscillator 2. The voltage output of digital-to-analog converter 5 is applied to the difference indicator 7, and is compared with the voltage output of digital-to-analog converter 6, which is controlled through precision potentiometer 8. The precision potentiometer can be calibrated in terms of percent of full speed. The potentiometer is set to the desired speed. When the output shaft is rotating at the desired speed, no error signal is given by the difference indicator 7. When the speed of the shaft differs from the desired speed, the difference indicator 7 will have an error voltage signal output that is proportional to the deviation of the shaft from the desired speed, and the polarity or sense of the voltage indicates if the shaft speed is less or greater than the desired speed.

By using the two substantially perfectly similar digital-to-analog channels, increased accuracy in the error voltage output from the difference indicator is gained. Errors caused by changes in the direct current supply voltage are almost entirely eliminated, since the resulting changes in output voltage of each channel will be very nearly equal. The use of the crystal oscillator reference channel prevents errors due to line frequency and voltage variations. Ambient temperature changes affect both channels equally and therefore cancel out.

An additional advantage is gained by placing the speed and reference channels on the opposite sides of the chassis. The chassis acts as an electro-static shield and eliminates much of the capacitive coupling between channels which would produce a beat frequency ripple in the output error signal if the channels were unshielded.

However, there is an important source of error in this type of digital-to-analog converter. The output volt-second area per input pulse is directly proportional to the saturation flux density of the core. Unfortunately, this flux density changes about a tenth of a percent per degree centigrade. The change of core saturation flux density with temperature will tend to balance out as long as the reference and speed channel cores are maintained at the same temperature. To keep the cores in the two channels at the same temperature is a difficult problem as the core loss and therefore the heat dissipated in the core is a function of the input frequency. The heat dissipated in the core of the reference channel is constant as its input frequency is determined by the crystal oscillator, while the heat dissipated in the core of the shaft speed channel varies with the speed of the shaft.

Figure 3:
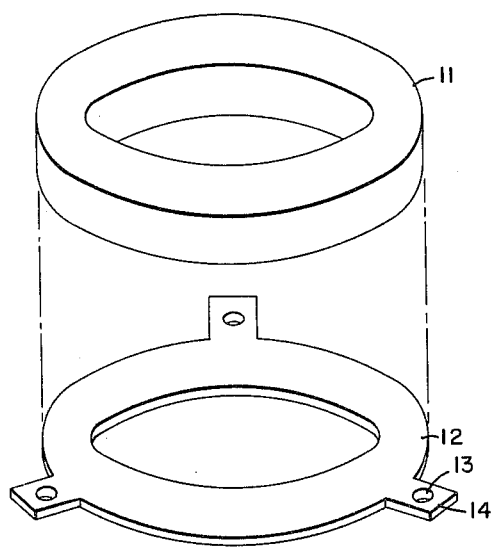
FIG. 3 is an isometric of the core and core mount of a saturating transformer as used in this invention.
Figure 4:
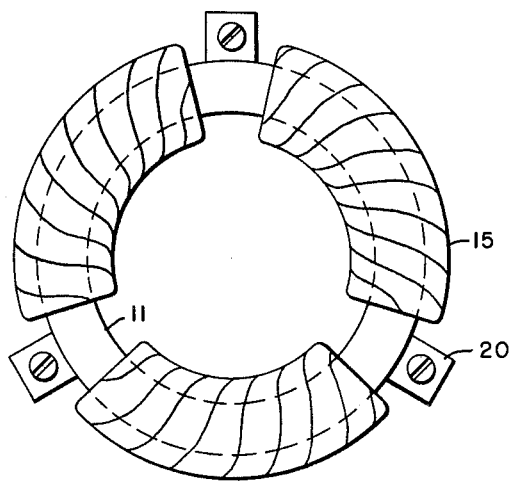
FIGS. 4 and 5 are detail sketches of the top and front views, respectively, of the saturating transformer and the common heat sink as shown in FIG. 1.
Figure 5:
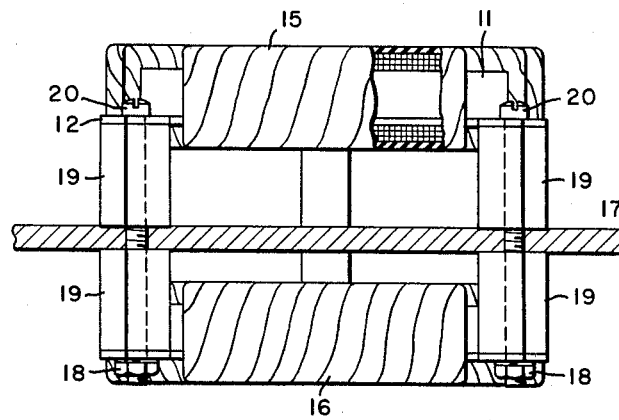

To prevent any temperature differential between the cores of the saturating transformers of the two channels, the construction of FIGS. 3, 4 and 5 is used. FIG. 3 shows how the core 11 and the core mount, 12 fit together. The core mount 12 is made of a material having a high thermal conductivity, such as copper. The inside and outside diameters of the core 11 and the core mount 12 are the same. The core mount 12 has suitable tabs 14 extending from its outer edge with a hole 13 drilled in each tab 14.

Referring to FIGS. 4 and 5, the windings, 15 and 16 of the saturating transformers for the respective channels are wound around their respective cores 11 and core mounts 12. The two core mounts 12, one for the transformer in each channel, are connected thermally to the chassis 17 serving as a heat sink, with copper posts 19. There is one post 19 on each side of the chassis for each tab 14. A hole is provided through the tabs on the core mounts, the posts 19 and the chassis 17, so that the saturating transformers may be secured together with the bolts 20 and nuts 18.

The posts 19, bolts 20, nuts 18 and chassis 17, are all preferably made of metal, such as copper, that rapidly conducts heat. Silver and aluminum are also satisfactory for this service. In view of the metals chosen and the arrangement of the parts, the construction described thus very effectively equalizes the temperatures of the cores as it provides a high thermal conductive path from the core, through the core mount, and through the posts to the chassis, which is used as a heat sink. The number and size of the tabs and posts is not critical, however, the higher the thermal conductivity, the greater the total cross-sectional area of the posts, and the shorter the length of the posts, the lower the temperature differential between the cores.

The preceding description and diagrams are to be taken as only illustrative and not to be construed in the limiting sense.

We claim as our invention:

1. In a speed control system, in combination, a reference channel, a speed channel having a voltage output proportional to the speed of a shaft to be controlled, and comparing means to compare the output of said reference channel with the output of said speed channel to give an error signal, said reference channel including crystal oscillating means, first pulse forming and amplifying means, first saturating transformer digital-to-analog converter means to receive the output of said first pulse former and amplifying means and to convert its input to a voltage output proportional to the frequency of said crystal oscillating means, means to control the output of said converter means, said comparing means to receive the output of said control means at a first input, said speed channel including reluctance pickup means that has a pulse repetition rate proportional to the speed of the shaft to be controlled, second pulse forming and amplifying means to receive the output of said reluctance pickup means, second saturating transformer digital-to-analog converter means to receive the output of said second pulse former and amplifying means and to convert its input to a voltage output proportional to the speed of the shaft to be controlled, and said comparing means to receive the output of said second converter means at a second input, and common direct current power supply means between said first pulse former and amplifying means and said second pulse former and amplifying means, each of said transformer converter means having a core and windings on said core, shielding means disposed between said reference and speed channels, each of said cores being provided with a core mount made of a material having a high thermal conductivity placed in thermal contact with the core, said windings around each core being wound around both the core and its core mount, said respective core mounts being thermally connected through suitable high thermal conductivity posts to opposite sides of said shielding means to form a high thermal conductivity path connecting said cores together and to said shielding means, whereby said shielding means is a heat sink for said cores.

2. In a system for detecting the defference between the speed of a device and a predetermined norm, a reference channel, a speed channel, a reference oscillator, transducer means that provides output pulses at a repetition rate which is a function of the speed of said device, said reference channel including first pulse forming means coupled to said osciilator for providing output pulses having a repetition rate related to the frequency of said oscillator, and first converter means coupled to the output of the pulse forming means for converting the output of the latter to a first analog signal which is proportional to the frequency of said oscillator, said speed channel including second pulse forming means coupled to said transducer means for providing output pulses having a repetition rate that is proportional to the pulse rate of the transducer output, and second converter means coupled to the output of the second pulse forming means for converting the output of the latter to a second analog signal which is proportional to the speed of said device, means responsive to said first and second analog signals for producing an error signal which is proportional to the deviation of said speed from a predetermined norm, each of said converting means including a saturating transformer with a core and a winding on the core coupled to the associated preceding pulse forming means, the response characteristic of each of said transfomers being affected by temperature changes of its core, the core of said transformer in the speed channel being subject to temperature fluctuation in response to variation of the speed of said device, said cores being magnetically isolated from each other, a common voltage supply source connected to said first and second pulse forming means, and high reluctance high thermal conductivity means defining a thermal conduction path connecting said cores together to maintain said cores at substantially the same temperature.

3. In a system for detecting the difference between a variable condition of a device and a predetermined norm: first and second respective saturating transformer converter means, each operable to convert pulses supplied thereto to an analog output signal which is a function of the repetition rate of the pulses; each said converter means having a saturating transformer core, a high thermal conductivity core mount in thermal contact with the core, and a winding wound around both the core mount and the core for receiving pulses to be converted into analog output signals; means for generating and supplying first pulses at a reference repetition rate to one of said converter means; means for generating and supplying to the other converter means second pulses at a repetition rate which varies as a function of variation of said condition; means responsive to the analog output signals from both converter means for producing an error signal which is a function of the difference between the repetition rates of said first and second pulses and thereby indicative of the deviation of said condition from said predetermined norm; and high thermal conductivity means connecting said core mounts together to thermally close-couple said cores, whereby said cores are maintained at substantially the same temperature.

4. The combination as in claim 3 wherein said condition is speed.

5. In a system for detecting the difference between a variable condition of a device and a predetermined norm: first and second respective saturating transformer converter means, each operable to convert pulses supplied thereto to an analog output signal which is a function of the repetition rate of the pulses; each said converter means having a saturating transformer core and a winding wound around the core for receiving pulses to be converted into analog output signals; means for generating and supplying first pulses at a reference repetition rate to one of said converter means; means for generating and supplying to the other converter means second pulses at a repetition rate which varies as a function of variation of said condition; means responsive to the analog output signals from both converter means for producing an error signal which is a function of the difference between the repetition rates of said first and second pulses and thereby indicative of the deviation of said condition from said predetermined norm; a thermally conductive electrostatic shield disposed between said cores to reduce capacitive coupling between the windings on the respective cores; and high thermal conductivity means connecting said cores to said shield whereby said shield is a heat sink for said cores and said cores are thermally closely coupled so that the temperature differential between said cores is minimized.

6. The combination as in claim 5 wherein said condition is speed.

7. In a system for detecting the difference between a variable condition of a device and a predetermined norm: first and second respective saturating transformer converter means, each operable to convert pulses supplied thereto to an analog output signal which is a function of the repetition rate of the pulses; each said converter means having a saturating transformer core, a high thermal conductivity core mount in thermal contact with the core, and a winding wound around both the core mount and the core for receiving pulses to be converted into analog output signals; means for generating and supplying first pulses at a reference repetition rate to one of said converter means; means for generating and supplying to the other converter means second pulses at a repetition rate which varies as a function of variation of said conditon; means responsive to the analog output signals from both converter means for producing an error signal which is a function of the difference between the repetition rates of said first and second pulses and thereby indicative of the deviation of said condition from said predetermined norm; a thermally conductive electrostatic shield disposed between said wound cores to reduce capacitive coupling between the windings on the respective cores; and high thermal conductivity means connecting said core mounts to said shield whereby said shield performs as a heat sink for said cores and said cores are thermally closely coupled so that they are maintained at substantially the same temperature.

8. The combination as in claim 7 wherein said condition is speed.

References Cited by the Examiner
UNITED STATES PATENTS

| | | | |
|---|---|---|---|
| 2,512,138 | 6/1945 | Butt | 174—35 X |
| 2,827,622 | 5/1952 | Guttwein | 324—70 X |
| 2,962,657 | 5/1956 | Horsch | 324—70 |
| 2,770,785 | 11/1956 | Haagens et al. | 336—61 |
| 2,864,555 | 12/1958 | Spencer | 340—347 |
| 2,875,432 | 2/1959 | Markow | 340—347 |
| 2,887,654 | 5/1959 | Strassman et al. | 324—70 |
| 2,935,683 | 5/1960 | Fauvelot | 324—70 |
| 2,947,957 | 8/1960 | Spindler | 336—61 |
| 3,110,018 | 11/1963 | James | 307—88 X |

WALTER L. CARLSON, *Primary Examiner.*

ELI J. SAX, SAMUEL BERNSTEIN, *Examiners.*